(No Model.)
G. ROOKE.
FILTER.
No. 556,438.  Patented Mar. 17, 1896.
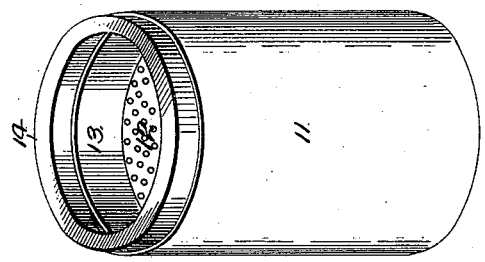
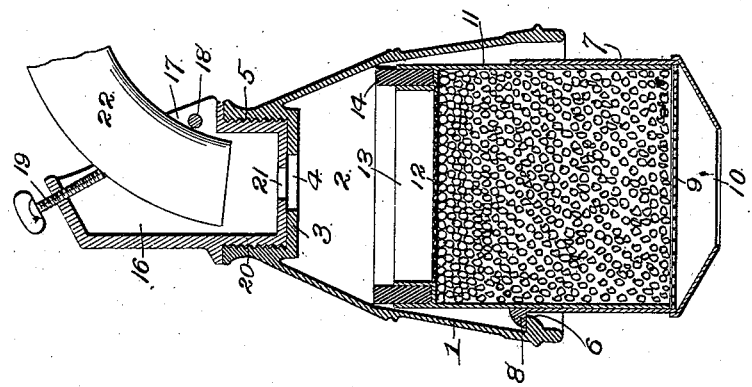
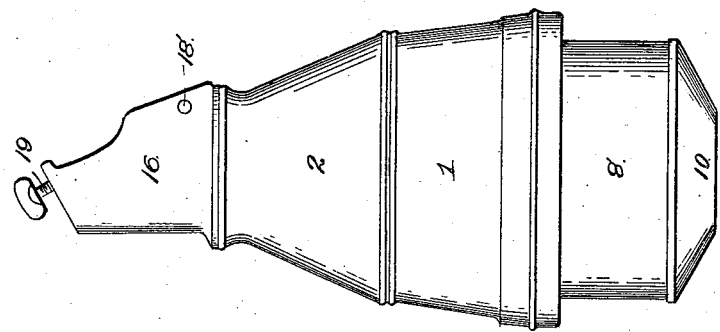
Witnesses:
F. G. Fischer
G. M. Thorpe
Inventor
Geo. Rooke,
By Higdon & Higdon
Attys.

UNITED STATES PATENT OFFICE.

GEORGE ROOKE, OF EMPORIA, KANSAS.

FILTER.

SPECIFICATION forming part of Letters Patent No. 556,438, dated March 17, 1896.

Application filed June 24, 1895. Serial No. 553,799. (No model.)

*To all whom it may concern:*

Be it known that I, GEORGE ROOKE, of Emporia, Lyon county, Kansas, have invented certain new and useful Improvements in Filters, of which the following is a full, clear, and exact description, reference being had to the accompanying drawings, forming a part thereof.

My invention relates to filters, and my object is to provide a device of this character which may be quickly and easily taken apart or put together by a kitchen attendant, without the use of implements of any kind; which thoroughly clears the water passing through it of all sediment, insects, &c.; which may be employed to great advantage in various combinations, and which combines in a high degree simplicity, strength, durability, and inexpensiveness of manufacture, so that it may be within the reach of all.

With these objects in view the invention consists in certain novel and peculiar features of construction and combinations of parts, as will be hereinafter described and claimed.

In order that the invention may be fully understood I will proceed to describe it, with reference to the accompanying drawings, in which—

Figure 1 represents a side view of a filter embodying my invention. Fig. 2 represents a vertical central section of the same as applied in operative position upon the faucet of an ice-cooler or equivalent device. Fig. 3 represents a detail perspective view of a part of the filtering apparatus proper. Fig. 4 is a plan view of the companion part of the filtering apparatus. Fig. 5 is a side view of a part of the same, to illustrate clearly its cam or wedge acting shoulders. Fig. 6 shows a part of the filter as operatively mounted upon the threaded nozzle of an ordinary water-pipe faucet.

Referring first to the construction embodied in Figs. 1 to 6, inclusive, 1 designates a shell or casing, which is approximately flaring or bell-shaped for about half its length, and then converges upwardly more abruptly, as shown at 2. This portion 2 internally forms a shoulder, for a purpose which will hereinafter appear. Near the upper end of the portion 2 the shell is provided internally with a partition or diaphragm 3, pierced centrally to provide the passage 4. Above said partition or diaphragm the shell is formed with an internally-threaded socket 5, and projecting inwardly of said shell or casing near its lower end are the shoulders 6, preferably three in number and arranged at equal distances from each other, said shoulders at their upper sides being formed with inclined or cam faces.

7 designates the outer and lower circular section of the filtering structure proper, and said section at its upper end is provided with three external shoulders 8, which shoulders at their under sides are provided with inclined or cam faces, the inclination thereof extending in the opposite direction to that of the shoulders 6. Said shoulders 8 also are arranged at equal distances from each other, and in length are slightly less than the distance between the shoulders 6. The said cylindrical section 7 is provided with a perforated or foraminous diaphragm or partition 9, and below the same converges to form the comparatively small discharge-nozzle 10. The other section, 11, of the filter proper is also cylindrical, and fits snugly within the section 7, and has its open lower end resting upon the diaphragm 9 thereof. At a suitable distance from its upper end said section is provided with a foraminous diaphragm 12, preferably of very fine wire mesh, and projecting above the same and arranged concentrically within the wall proper is the annular flange 13, so as to provide an annular groove for the reception of the rubber gasket 14.

To secure this filter operatively within the shell or casing the gasket-carrying end is first placed upwardly into said shell until it comes in contact with the internal surface of the conical portion 2 and the shoulders 8 register with and occupy spaces between the shoulders 6. Sufficient pressure is now brought against the resistance of the gasket 14 to permit the higher end of the inclined or cam faces of the shoulders 8 to pass the lower or opposing ends of the cam-faces of the shoulders 6. The filter device is now given a twist or turn of about sixty degrees, which causes the cam-faces of the shoulders 8 to ride upon the cam-faces of the shoulders 6, and by this wedge-like pressure force the gasket 14 so tightly against the internal surface or shoulder of the portion 2 that an absolutely liquid-tight joint is provided.

The device, with the parts as now assembled, may be employed directly upon the screw-threaded nozzle of an ordinary water-faucet, as shown at 15 in Fig. 6. If it be desired to employ the filter in connection with an ordinary ice-cooler I employ a tubular connection 16. Said tubular connection is provided with an open mouth at one end, as at 17, and bridging the same near its lower end is the pin or bolt 18. Opposing said bolt and adjustable toward or from the same is the set-screw 19. At its lower end said connection is provided with an externally-threaded extension 20, which is adapted to engage the internally-threaded socket 5, and is provided with a discharge-opening 21, which registers with the supply-opening 4 of the casing. To secure the filter now upon the faucet 22 of an ice-cooler, the said faucet is projected into the mouth 17 of the connection 16, and rests upon the bridge-pin 18. The set-screw is now operated to impinge upon the opposite side of said faucet, and make the relation between the same and the filter secure.

It will be apparent from reference to Figs. 2 and 6 that the water passes into the filter through the opening 4, and under pressure is forced through the diaphragm 12, the filtering material, such as pebbles, sand, sponges, or any other equivalent material, and escapes in a purified condition through the perforated diaphragm 9 and the discharge-nozzle 10 into any suitable receptacle placed below to receive it.

To cleanse said filter it is only necessary to grasp the section 8, twist it slightly in the direction opposite to that above indicated, to cause the disengagement of the cam-faced shoulders. It may then be held under a faucet, and any sediment, insects or matter upon the diaphragm 12 and the contiguous parts may be washed off. At suitable intervals of time the filtering material may be cleansed by simply slipping apart the telescopic sections of the filter proper. The parts may be reassembled as easily.

From the above description it will be apparent that the filter may be taken apart to be cleaned and the parts reassembled properly in position by any unskilled kitchen attendant without the use of implements of any description.

It is to be understood of course that slight changes in the form, proportion, and arrangement of the parts may be resorted to without departing from the essential spirit and scope or sacrificing any of the advantages of my invention.

Having thus described the invention, what I claim as new, and desire to secure by Letters Patent, is—

1. A filter, comprising a shell or casing, provided with an internal perforated partition, and an internal annular shoulder, and an internally-threaded socket, in combination with a pair of filtering-sections fitting telescopically together and provided with opposing foraminous diaphragms between which the filtering material is retained, a compressible gasket carried by one of said sections, and means to compress and secure the same against the internal shoulder of said shell or casing, substantially as set forth.

2. A filter, comprising a shell or casing provided internally with an annular shoulder, a series of cam-faced shoulders, a perforated partition and an internally-threaded socket communicating with said perforated partition and adapted to engage a water-faucet, a pair of filtering-sections fitting telescopically together and provided with a compressible gasket to engage the internal shoulder, and with a series of opposing cam-faced shoulders to engage the shoulders of the shell or casing, substantially as set forth.

3. A water-filter, comprising a shell or casing having a water-supply opening at one end and open at its opposite end, and filtering-sections fitting telescopically together and provided with opposing foraminous diaphragms between which the filtering material is retained, one of said sections being provided with an annular groove and a compressible gasket therein, and the other with a converging nozzle to concentrate the filtered water, and means to secure said sections within said shell or casing and to compress the gasket to make a perfectly water-tight joint, substantially as set forth.

In testimony whereof I affix my signature in presence of two witnesses.

GEORGE ROOKE.

Witnesses:
JOSHUA ROOKE,
JOHN G. NORTHINGTON.